March 5, 1935.  H. ROSER  1,993,528

CONTINUOUS MIXER FOR DOUGH AND THE LIKE SUBSTANCES

Filed Oct. 30, 1931

Inventor
Heinrich Roser

By George B. Willcox
Attorney

Patented Mar. 5, 1935

1,993,528

UNITED STATES PATENT OFFICE 1,993,528

CONTINUOUS MIXER FOR DOUGH AND THE LIKE SUBSTANCES

Heinrich Roser, Stuttgart-Cannstatt, Germany, assignor to Baker Perkins Company, Inc., Saginaw, Mich., a corporation of New York Application October 30, 1931, Serial No. 572,176 In Germany November 1, 1930

6 Claims. (Cl. 259—3)

This invention relates to mixers of the rotary drum type for the continuous mixing of heavy or plastic substances, such as bread dough, viscose, synthetic resins, and the like.

It has for its object the provision of an improved mixer especially adapted for the mixing and treatment of solid or semi-solid substances with liquid ingredients, which after mixing assume plastic consistency. For example, the invention is adapted for the treatment of caustic-treated cellulose with carbon disulfide in the production of rayon. The provision of co-acting serrations and teeth on the mixing drum surface and blade, or blades, respectively adapts the invention to use in shredding paper or other cellulose pulp. It can also be used for the mixing and kneading of bread dough.

In mixing materials of this type it is important that the ingredients be retained in the machine until they are thoroughly incorporated and take on a semi-solid or plastic consistency. They then are kneaded and worked at an even rate of speed toward the discharge end of the mixing drum so that the product discharged will be mixed and kneaded to a uniform extent at all times.

The improved means by which I accomplish this result comprises broadly a mixing drum mounted for rotation about its longitudinal axis which is positioned approximately horizontal. The lower surface or wall of the drum is inclined upwardly toward its discharge end. Several modes of construction may be employed to effect this. The mixing drum may be cylindrical shaped and its axis inclined upwardly toward the discharge end of the drum, or the axis may be horizontal and the drum reduced in diameter toward its outlet, or both features of construction may be employed. Driving means of suitable type is provided to rotate the drum. The mixing and kneading action is accomplished by the tumbling effect of the drum, together with the action of a stationary kneading bar extending lengthwise of the drum and positioned close to the surface of the drum.

To move the material up the inclined surface of the drum toward its discharge end, the kneading blade may be given a helical form.

A further object of the invention is to provide improved mechanisms for accomplishing the desired uniform mixing and propelling action, which will be described below.

Figure 1:
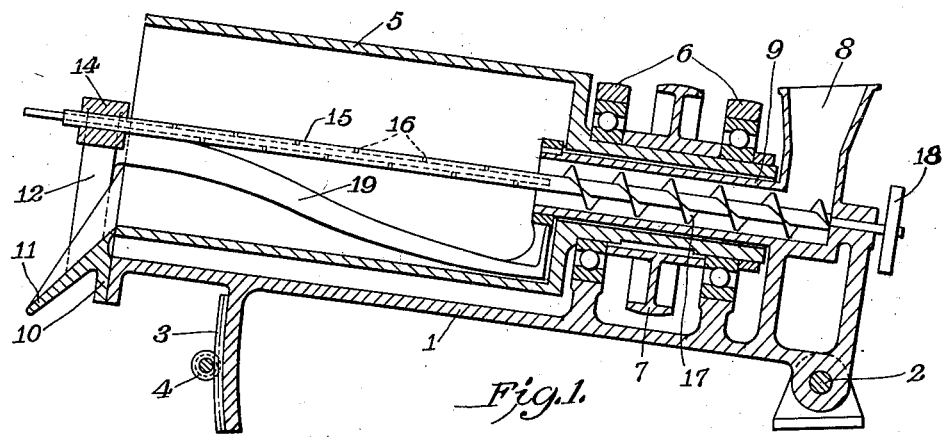

Referring to the drawing, Fig. 1 shows a longitudinal cross-section of one form of the invention.

Figure 2:
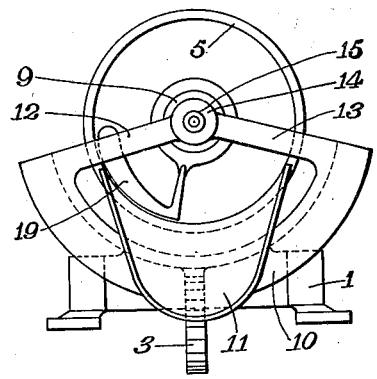

Fig. 2 is an end view taken from the left in Fig. 1.

The machine shown comprises a frame 1 supported at one end on a trunnion bearing 2 and inclined slightly from the horizontal, as shown. At its other end it is supported by a gear segment 3 meshing with the pinion 4, which is rotatable to raise or lower the end of frame 1 and adjust its inclination from the horizontal.

The cylindrical mixing drum 5 is mounted for rotation in bearings 6, supported by frame 1. A drive pulley 7 is fixed to drum 5 for connection to a suitable source of power, not shown.

At the lower end of frame 1 there is provided a feed-in funnel 8 integral with the frame and communicating with a feed tube 9 which leads to the interior of the drum. At the open end of the drum a flange 10 is fixed to the frame and carries a discharge chute 11 positioned to receive material coming from the drum. Radial arms 12, 13 fixed to the flange 10 carry a bearing 14 positioned at the axis of the drum. An axial shaft 15 is journaled in bearing 14 and extends through the drum to a journal in the other end of the frame. Shaft 15 is preferably made hollow and is provided with perforations 16. When liquid is to be added during the mixing process, the outer end of the shaft is coupled to the supply of liquid (not shown). A feed screw 17 is fixed to shaft 15 within the feed tube 9 to carry semi-solid or dry ingredients from the funnel 8 through the tube to the mixer. Shaft 15 is driven through a pulley 18.

A stationary kneader blade 19 is positioned within the drum and is fixed at the outlet end of the drum to arms 12, 13 and at the inlet end it is keyed to the end of the feed tube 9. The blade 19 is preferably helical in shape, as shown, so as to follow the contour of the wall of the drum in the direction of rotation of the latter and lies closely adjacent the wall of the drum so that material is propelled toward the discharge chute 11 as the drum rotates. Blade 19 is supported, as shown, on fixed members, one of them being the end of tube 9, projecting into the drum through its head, the other being supported by one of the arms 12. The blade is preferably shaped so as to follow the contour of the lower part of the wall of the drum in the direction of rotation of the latter.

In the operation of this machine the solid ingredients are fed through funnel 8 to feed screw 17 which propels them continuously into the mixing drum and the liquid is supplied through hollow shaft 15. These loose ingredients, as for example, flour and water, are mixed at the lower end of the drum by the tumbling action of the drum and the stirring action of the blade 19. Due to the upward inclination of the drum toward the outlet, they tend to remain at the supply end until they are incorporated with each other and assume a doughy plastic consistency. As soon as they have reached this state the plastic mass is acted upon by the kneader blade 19 and is worked gradually upwardly toward the discharge end of the drum. While it is thus carried to the discharge point it is given the necessary kneading and stretching to develop its plasticity and give it a uniform consistency.

If the lower wall of the mixing drum were horizontal or inclined downwardly to the outlet of the drum the loose unmixed ingredients, for example, flour and water, would tend to flow rapidly toward the outlet as soon as they entered the drum, and some parts of the material would be discharged insufficiently mixed, while other parts would be stiff and lacking in moisture. Even if the product might be reasonably well mixed and homogeneous, a good share of its travel through the drum would be wasted, and the kneading action would be too brief to "develop" some plastic substances, for example, bread dough.

By my improved construction the ingredients are retained in the drum until they are thoroughly incorporated, and they tend to flow back to the inner end of the drum until they have assumed a plastic consistency such that they can be acted upon by the helical kneader blade or bar.

In the practical use of my invention the mixing and kneading operation is intensified by adjusting the drum so that the material being worked has to rise upward somewhat toward the discharge end of the drum. To make this movement of the material steady, the spiral stationary blade is arranged along the inner surface of the drum at its lowest part. Practical operation has shown that it is possible to exert a constant moving action on the kneaded material, by means of the stationary blade in the bottom of the revolving drum, so that the material while being subjected to strong kneading and mixing action moves slowly along the kneading oven to the upper or discharge end of the drum where it is discharged completely kneaded and mixed. The rate of movement of the material can be varied over a wide range according to requirements by changing the angle of inclination of the bottom wall of the rotating drum.

Having thus described my invention, what I claim and desire to secure by Letters Patent is:

1. A mixing machine comprising in combination a drum mounted for rotation about its axis of symmetry with said axis in a recumbent position, said drum open at one end for the discharge of mixed material and having the bottom of its inside wall inclined upwardly toward said discharge end, power-actuated means for driving said drum, means for feeding ingredients to be mixed to the lower inlet end of said drum, and a stationary bar or blade positioned close to and extending along the inner surface of the drum at the lower part thereof, said bar being helical in form to co-act with the rotating drum and propel the material toward said discharge end of the drum.

2. A structure as set forth in claim 1 wherein the helical blade is shaped so as to follow the contour of the wall of the drum in the direction of rotation of the latter.

3. In a mixing machine having a drum and a head integral therewith mounted for rotation about its axis of symmetry which is in a recumbent position, the lower portion of the wall of the drum being inclined upwardly toward the discharge end, means for rotating said drum, a stationary kneading and material propelling blade within the drum, said blade being supported at both ends on fixed members, one of which projects into the drum through the central portion of the rotatable head, said blade being positioned close to said lower wall of the drum and extending lengthwise thereof.

4. A structure as set forth in claim 3, wherein the drum is mounted for inclined adjustment in a vertical plane for assisting in controlling the mixing and kneading operation, and means is provided for effecting such adjustment of its inclination.

5. A mixing machine comprising in combination a drum mounted for rotation about its axis of symmetry with said axis in a recumbent position, said drum being open at one end for the discharge of mixed material and having the bottom of its inside wall inclined upwardly toward said discharge end, power actuating means for driving said drum, means for effecting inclined adjustment of said drum in a vertical plane to assist in controlling the mixing operation, said adjusting means comprising a tiltable frame having a trunnion mounted on a fixed support, and means adapted to raise and lower an end of the frame relatively to the trunnion, means for feeding ingredients to be mixed to the lower inlet end of said drum, and a stationary bar or blade positioned close to and extending along the inner surface of the rotatable drum at the bottom portion thereof, said bar being adapted to co-act with the drum to propel material toward the discharge end of the drum when the material assumes plastic consistency.

6. A mixing machine comprising in combination, a frame, a drum mounted thereon for rotation about its axis of symmetry with said axis in a recumbent position, said drum open at one end for the discharge of mixed material and having the bottom of its inside wall inclined upwardly toward said discharge end, there being fixed to the drum at its feed end a coaxial rearwardly extending tubular member mounted for rotation in bearings on the said frame, feed means within said tubular member comprising a helical screw mounted on a hollow rotatable shaft having perforations intermediate its ends, said shaft being supported on end bearings carried by the frame, and a stationary bar or blade positioned close to and extending along the inner surface of the drum at the bottom thereof, said bar being adapted to co-act with the rotating drum so as to gradually propel the material toward the discharge end of the drum while subjecting it to kneading action.

HEINRICH ROSER.